May 7, 1929.     E. W. DAVIS     1,711,777
LUBRICANT COMPRESSOR AND COUPLING THEREFOR
Filed May 21, 1924
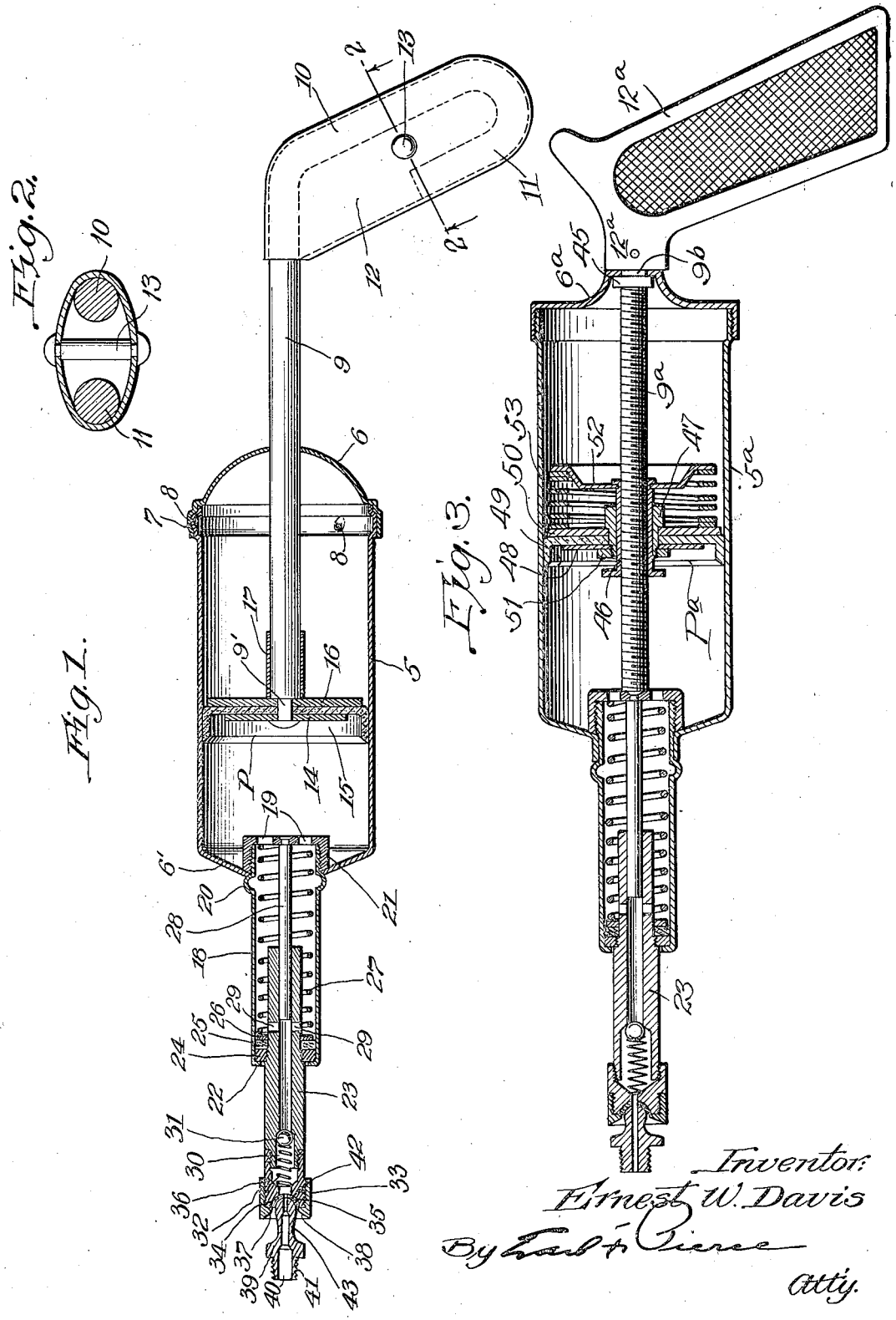

Patented May 7, 1929.

1,711,777

UNITED STATES PATENT OFFICE.

ERNEST W. DAVIS, OF OAK PARK, ILLINOIS, ASSIGNOR TO ALEMITE MANUFACTURING CORPORATION, OF CHICAGO, ILLINOIS, A CORPORATION OF DELAWARE.

LUBRICANT COMPRESSOR AND COUPLING THEREFOR.

Application filed May 21, 1924. Serial No. 714,875.

My invention relates to improvements in lubricant compressors and couplings therefor, and is particularly concerned with improvements in that type of lubricant compressor and coupling forming a part of a so-called "high pressure" lubricating system. Such a system comprises a plurality of fittings, each of which is adapted to be secured to a bearing to be lubricated, and a compressor for successively supplying lubricant under high pressure to the various fittings, the compressor embodying means for making sealed contact with the fittings.

The objects of my present invention are:

First, to provide a compressor for a lubricating system of the character described, comprising a barrel for holding a supply of lubricant, a cylinder communicating with the barrel, means in the barrel for insuring the discharge of lubricant from the barrel into the cylinder, and means for ejecting lubricant from the cylinder.

Second, to provide a lubricant compressor, such as described, in which the same handle is used for operating the means which discharges the lubricant from the barrel and from the cylinder.

Third, to provide a lubricant compressor, such as described, comprising a screw-threaded piston rod, a barrel rotatably mounted upon the piston rod, a piston reciprocable through substantially the entire length of the barrel, and means actuated by the rotation of the barrel upon the piston rod for placing the piston under spring pressure.

Fourth, to provide a compressor of the character described which is simple in construction, economical to manufacture and easy to operate.

Fifth, to provide a coupling for a lubricating system, such as described above, comprising two elements; one a fitting adapted to be secured to a bearing to be lubricated and the second a coupling member secured to the compressor and comprising means for contacting with the fitting for making a sealed connection between the compressor and the fitting.

Sixth, to provide a coupling of the character described, in which the two elements referred to can contact with each other at various angles and still maintain a sealed contact therebetween.

Seventh, to provide a coupling, such as described, in which the fitting is provided with a spherical contact surface and the coupling member comprises a correspondingly conformed surface for making sealed contact therewith.

Eighth, to provide a coupling, such as described, which is simple in construction and economical to manufacture.

Other objects of my invention will appear as this description progresses, reference being had to the accompanying drawings, in which Figure 1 is a central, longitudinal section through a compressor embodying one form of my invention;

Figure 2 is a section taken on line 2—2 of Figure 1; and

Figure 3 is a central, longitudinal section through a modified embodiment of my invention.

Throughout the several views similar reference characters will be used for referring to similar parts.

For that embodiment of my invention which is illustrated in Figures 1 and 2 I provide a compressor comprising the barrel 5 which is provided with a cap 6, having cam grooves 7 pressed therein, adjacent its edge, for engaging bosses 8, pressed from the adjacent portions of the barrel. A piston rod 9 is slidably mounted in the cover 6 and its outer end is bent laterally, as shown at 10, and then turned upon itself, as shown at 11, to provide a strong support for the sheet metal covering 12, which acts as a handle for exerting pressure upon the piston rod 9. A spacer rivet 13, passing through both sides of the handle, secures the sides in place, as shown.

A piston P, comprising the face plate 14, the cup leather 15 and follower plate 16, is secured upon the reduced portion 9' of the piston rod. The inner end of the piston rod is provided with a collar 17 for limiting the outward movement of the piston relatively to the cap 6.

From the above description, it will be apparent that when pressure is exerted upon the handle in the direction of the piston P, the lubricant confined between the piston P and the closed end of the barrel 5 will be placed under pressure and forced into the guide tube 18, through the openings 19 in the nut 21. The guide tube 18 has an annular bead 20 formed therein for engaging one side of the end 6' of the barrel 5, and is rigidly clamped against this end of the barrel by means of the nut 21. The outer end of the guide tube 18 is flanged inwardly, as shown at 22, to provide a guide surface for the reciprocating high pressure cylinder 23, which is slightly reduced in diameter, intermediate its ends, to provide shoulders for the nut 24, the gasket 25 and washer 26 to rest against. A spring 27, confined between the washer 26 and the nut 21, yieldingly holds the high pressure cylinder 23 at its outermost position.

A plunger rod 28 has its inner end secured to the central portion of the nut 21 and its outer end projects into the inner end of the high pressure cylinder 23 when the latter is in its outermost position. In this position, the ports 29, extending through the walls of the cylinder 23, are uncovered, thereby permitting lubricant to be forced from the barrel 5, through the guide tube 18 and into the cylinder 23.

The outer end of the cylinder 23 is counterbored, as shown at 30, to form a seat for the ball closure or valve 31. This valve is yieldingly held upon its seat by means of the compression spring 32, confined between the ball and the cap 33 threaded upon the outer end of the cylinder 23. This cap is provided, at its outer end, with a substantially spherically shaped depression 34, which receives a similarly shaped gasket or sealing member 35, preferably formed of leather, but which can be made of any other suitable material. A collar 36, threaded upon the outer end of the cap 33, is provided with an inwardly extending flange 37 which overlaps the outer edge of the gasket 35 and thereby holds it in place. The outer face of the flange 37 is beveled inwardly, as shown at 38.

The fitting, forming a part of my improved lubricating system and a part of my coupling for the lubricating system, comprises the body member 39, which has a passageway 40 extending longitudinally therethrough. One end of the body member 39 is threaded, as shown at 41, to provide means for securing the fitting to a bearing, and the other end is provided with a spherical contact surface 42 for making sealed contact with the gasket 35. This end of the fitting is connected with the remaining portion of the body member by means of a portion 43 of reduced cross section. This construction, combining with the beveled face 38 of the flange 37, permits the compressor to be rocked about at various angles to the fitting without destroying the seal between the two elements and without destroying the possibility of forcing lubricant through the sealing member into the fitting.

In using my improved compressor embodying the fitting and coupling member described above, the operator first fills the barrel 5 with lubricant. This is accomplished by removing the cap 6, the piston rod 9, and the parts attached thereto, and packing lubricant into the barrel 5, exercising care to entrap as little air as possible, although the presence of air will not interfere with the operation of my compressor except in so far as it will cause the compressor to discharge air from time to time in place of lubricant. After the compressor has been filled, the operator brings the compressor coupling member described above into contact with the fitting 39, in the manner shown in Figure 1, and exerts pressure upon the handle in a direction toward the fitting. The spring 27 has sufficient tension so that the initial pressure exerted upon the handle does not cause relative movement of the cylinder 23 and plunger 28 until after lubricant has been forced from the barrel 5 through the guide tube 18 and ports 29 into the cylinder 23. Continued and increased pressure upon the handle then causes the plunger 28 to move into the cylinder 23 and discharge the contents thereof, past the check valve 31 and into the fitting. By alternately exerting pressure upon the handle and then relieving the pressure, the operator can force as much lubricant into the fitting as he may desire. As stated above, the particular construction of the fitting and the coupling member permits the compressor to make sealed contact with the fitting from any one of a large number of different angles, so that even if the fitting should happen to be located in a more or less inaccessible position, the operator will have no difficulty in making a sealed connection between it and the compressor.

The compressor illustrated in Figure 3 is similar to that shown in Figure 1, except that here the piston rod 9ª is screwthreaded and the barrel 5ª is rotatably mounted upon the piston rod. For this purpose the outer end of the piston rod, at the point indicated by the reference character 9ᵇ, forms a journal for the cap 6ª to rotate upon. The collar 45 and the adjacent portion of the handle 12ª provide means for preventing movement of the barrel 5ª longitudinally of the piston rod 9ª.

A tubular nut 46 is threaded upon the piston rod 9ª and a piston Pª is slidably mounted upon the nut 46. The exterior of the nut 46 is polygonal in cross section. This piston comprises the sleeve 47, upon which are mounted the face plate 48, the cup leather 49 and the follower plate 50, these elements having central apertures for receiving the reduced end of the sleeve 47, and being clamped upon the sleeve 47 by means of the nut 51. The bore of the sleeve 47 conforms to the exterior of the nut 46 so that when the sleeve 47 is rotated the nut 46 will rotate therewith. A disc 52 is mounted upon the outer end of the nut 46 and acts as a stop for one end of the compression spring 53, the other end of which engages the follower plate 50.

In the operation of the compressor just described, the operator first removes the cap 6ª, the piston rod 9ª and piston Pª and then substantially fills the barrel with lubricant. The piston rod and piston are then replaced, as shown in Figure 3. In doing this the spring 53 is placed under slight tension and the lubricant tends to press the flange of the cup leather 49 into frictional contact with the wall of the barrel 5ª. The operator then makes use of this compressor in the same manner as that described above. As the lubricant is withdrawn from the barrel 5ª, the spring 53 will gradually force the piston toward the closed end of the barrel, until the tension of the spring 53 becomes insufficient to displace the lubricant from the barrel 5ª into the cylinder 23. Thereupon, the operator grasps the handle 12ª in one hand and with the other hand rotates the barrel 5ª upon the piston rod 9ª. This causes the nut 46 to rotate upon the piston rod 9ª in a direction tending to move the nut 46 toward the closed end of the barrel 5ª, and thereby again placing the spring 53 under tension. The compressor is then ready to operate again in the manner described above.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. In high pressure lubricating apparatus of the class described, a lubricant compressor having a discharge conduit terminating in a nozzle for forming a lubricant-tight connection with a nipple attached to a part to be lubricated, said nozzle including a metallic part having a spherically concave surface surrounding a lubricant passage way having an axis passing through the center of said spherical surface, a leather sealing washer resting against said concavely spherical surface and having a concavely spherical contact face for establishing a lubricant-tight seal with said lubricant receiving nipple, and a removable member for retaining said sealing washer in position, said removable member having an opening permitting access to said sealing washer and an outwardly flaring surface surrounding said opening and forming a means for guiding said nozzle into operative relation with said lubricant receiving nipple.

2. In high pressure lubricating apparatus of the class described, a lubricant compressor having a discharge nozzle for effecting a sealed connection with a nipple attached to a part to be lubricated, said nozzle including a passageway through which the lubricant is discharged, a sealing member mounted adjacent the outlet end of said nozzle, the said nozzle and sealing member having complemental faces inclined with respect to said passageway and co-operating to provide a lubricant-tight seating engagement therebetween, said sealing member having a second face for forming a lubricant-tight connection with said nipple and including an aperture permitting passage of lubricant to said nipple, that portion of the first mentioned face of said sealing member surrounding said aperture being exposed to the pressure of the lubricant to create a lubricant-pressed seal between said sealing member and nipple, and a removable member for securing the sealing member on its seat, said removable member having an open end for the reception of said nipple, said sealing member being exposed within such open end, whereby said nipple constitutes an additional means for maintaining seated relation of the sealing member.

In witness whereof, I hereunto subscribe my name this 15th day of May, 1924.

ERNEST W. DAVIS.